US012415190B2

(12) United States Patent
Heebner et al.

(10) Patent No.: US 12,415,190 B2
(45) Date of Patent: Sep. 16, 2025

(54) COLLECTOR COMPOSITION AND METHODS OF USING THEREOF

(71) Applicant: Kraton Polymers LLC, Houston, TX (US)

(72) Inventors: Gerald Heebner, Savannah, GA (US); Lloyd Nelson, Savannah, GA (US)

(73) Assignee: Kraton Corporation, The Woodlands, TX (US)

( * ) Notice: Subject to any disclaimer, the term of this patent is extended or adjusted under 35 U.S.C. 154(b) by 636 days.

(21) Appl. No.: 17/644,906

(22) Filed: Dec. 17, 2021

(65) Prior Publication Data

US 2022/0193695 A1 Jun. 23, 2022

Related U.S. Application Data

(60) Provisional application No. 63/199,341, filed on Dec. 21, 2020.

(51) Int. Cl.
*B03D 1/02* (2006.01)
*B03D 1/006* (2006.01)

(52) U.S. Cl.
CPC ............. *B03D 1/023* (2013.01); *B03D 1/006* (2013.01); *B03D 2201/02* (2013.01); *B03D 2203/02* (2013.01)

(58) Field of Classification Search
CPC ...... B03D 1/008; B03D 2201/02; B03D 1/01; B03D 1/02; B03D 2203/02; B03D 2203/08; B03D 1/016; B03D 2203/06; B03D 1/021; B03D 3/06; B03D 2201/06; B03D 2203/006; B03D 1/006; B03D 2203/04; B03D 1/0046; B03D 2201/04; B03D 2203/10; B03D 1/012; B03D 2201/007; B03D 1/023; B03D 1/08; B03D 2203/025; B03D 1/00; B03D 1/004; B03D 1/0043; B03D 1/06; B03D 1/002; B03D 2201/005; B03D 1/011; B03D 1/014; B03D 1/018; B03D 1/085; B03D 1/12; B03D 1/1431; B03D 1/16; B03D 2201/002; B03D 2203/005; B03D 2203/008; B03D 1/026; B03D 1/028; B03D 1/1456; B03D 1/1462; B03D 1/18; B03D 1/247
See application file for complete search history.

(56) References Cited

U.S. PATENT DOCUMENTS

2009/0301972 A1* 12/2009 Hines ...................... C05C 9/005 210/705
2020/0206749 A1* 7/2020 Rothman ............... B03D 1/016
2020/0261924 A1* 8/2020 Rothman .............. C08F 236/08

FOREIGN PATENT DOCUMENTS

WO WO-2009011639 A2 * 1/2009 ............... C10G 3/47
WO WO-2016161032 A1 * 10/2016

OTHER PUBLICATIONS

De Bruycker (Assessing the Potential of Crude Tall Oil for the Production of Green-Base Chemicals: An Experimental and Kinetic Modeling Study, Ind. Eng. Chem. Res. 2014, 53, 48, 18430-18442) (Year: 2014).*
Anthonykutty (Hydrotreating reactions of tall oils over commercial NiMo catalyst, Energy Science and Engineering 2015;3(4): 286-299) (Year: 2015).*
Palanisamy (Hydroprocessing of fatty acid methyl ester containing resin acids blended with gas oil, Fuel Processing Technology 126 (2014) 435-440) (Year: 2014).*
Anthonykutty (Value Added Hydrocarbons from Distilled Tall Oil via Hydrotreating over a Commercial NiMo Catalyst, Ind. Eng. Chem. Res. 52 (30), 10114-10125) (Year: 2013).*
Snow (Froth modification for reduced fuel oil usage in phosphate flotation, Int. J. Miner. Process. 74 (2004) 91-99) (Year: 2004).*
Pires (Energy Fuels 2019, 33, 4683-4720) (Year: 2019).*
Kim (Journal of Analytical and Applied Pyrolysis vol. 138, Mar. 2019, pp. 132-136) (Year: 2019).*

* cited by examiner

*Primary Examiner* — Bobby Ramdhanie
*Assistant Examiner* — Boi-Lien Thi Nguyen
(74) *Attorney, Agent, or Firm* — Beth Haslam

(57) ABSTRACT

The disclosure relates to a method for the beneficiation of an ore in a froth flotation process. The method comprises contacting an ore in a liquid medium to a collector composition comprising a plant-derived liquid decarboxylated rosin acid (DCR) collector. The DCR comprises 40 to 100 wt. % of tricyclic compounds having 18-20 carbon atoms, one or more C═C groups, and m/z (mass/charge) value of 220-280. The DCR has an oxygen content of <5%, a density of 0.9 to 1.0 g/cm$^3$ at 20° C., and an acid value of <50 mg KOH/g.

20 Claims, No Drawings

COLLECTOR COMPOSITION AND METHODS OF USING THEREOF

RELATED APPLICATIONS

This application claims priority from U.S. Provisional Application No. 63/199,341, with filing date of Dec. 21, 2020, the entire disclosure of which is incorporated herein by reference.

FIELD

The disclosure relates to method for the beneficiation of an ore in flotation processes containing a bio-based collector.

BACKGROUND

Froth flotation is used for beneficiating ores. In a beneficiation process, two or more materials which coexist in a mixture (the fines) are separated from each other using chemical and/or mechanical processes. Often one of the materials (the beneficiary) is more valuable or desired than the other material (the gangue). Typically, flotation uses the difference in the hydrophobicity of the respective components. The components are introduced into the flotation apparatus sparged with air, to form bubbles. The hydrophobic particles attach to the bubbles, buoying them to the top of the apparatus. The floated particles (the concentrate) are collected, and the less hydrophobic particles (the tailings) tend to migrate to the bottom of the apparatus from where they can be removed.

Two common forms of flotation separation processes are direct flotation and reverse/indirect flotation. In direct flotation processes, the concentrate is the beneficiary, and the tailings are the gangue. In reverse flotation processes, the gangue constituent is floated into the concentrate and the beneficiary remains behind in the slurry. The object of flotation is to separate and recover as much of the valuable constituent(s) of the fine as possible in as high a concentration as possible which is then made available for further downstream processing steps.

Froth flotation separation can be used to separate solids from solids (such as the constituents of mine ore) or liquids from solids or from other liquids (such as the separation of bitumen from oil sands). When used on solids, froth separation often includes having the solids comminuted (ground up by such techniques as dry-grinding, wet-grinding, and the like). After the solids have been comminuted, they are more readily dispersed in the slurry and the small solid hydrophobic particles can more readily adhere to the sparge bubbles.

There are a number of additives that can be added to increase the efficiency of a froth flotation separation. Collectors are additives which can be used to enhance hydrophobicity in froth flotation. Examples of collectors in the prior art are typically fossil-based, e.g., fuel oils, diesel, tar oils, etc.

There is a need for a more environmentally friendly replacement for the typically used fossil fuel collectors in ore flotation processes to improve processes, enhance selectivity, and facilitate recovery of the beneficiary.

SUMMARY

In one aspect, a method for the beneficiation of an ore in a froth flotation process is provided. The method comprises: providing a slurry comprising the ore dispersed in a liquid medium; contacting the slurry with a collector composition comprising a decarboxylated rosin acid ("DCR"), sparging the slurry; and recovering the beneficiated ore from the slurry. The DCR comprises 40 to 100 wt. % of tricyclic compounds having 18-20 carbon atoms, one or more C═C groups, and m/z (mass/charge) value of 220-280, as measured by GC-FID-MS. The DCR also has an oxygen content of <5%, a density of 0.9 to 1.0 g/cm$^3$ at 20° C., and an acid value of <50 mg KOH/g, as measured using ASTM E28-18.

In another aspect, a method for the beneficiation of an ore in a froth flotation process is provided. The method comprises providing a slurry, sparging the slurry, and recovering the beneficiated ore from the slurry. The slurry comprising an ore, a liquid medium, and a collector composition comprising a DCR. The DCR comprises 40 to 100 wt. % of tricyclic compounds having 18-20 carbon atoms, one or more C═C groups, and m/z (mass/charge) value of 220-280, as measured by GC-FID-MS. The DCR also has an oxygen content of <5%, a density of 0.9 to 1.0 g/cm$^3$ at 20° C., and an acid value of <50 mg KOH/g, as measured using ASTM E28-18.

In another aspect, a slurry composition for the beneficiation of an ore in a flotation process is provided. The composition comprises an ore, a liquid medium, and a collector composition in an amount of 0.02-20 lb. per ton of ore, and optional components, in an amount of <20 wt. %, selected from a frothing agent, a depressant, an activator, a modifier, and combinations thereof, based on the total weight of the slurry. The collector comprises >0.5 wt. % of a decarboxylated rosin acid ("DCR") and <99.5 wt. % of an additional collector. The DCR comprises 40 to 100 wt. % of tricyclic compounds having 18-20 carbon atoms, one or more C═C groups, and m/z (mass/charge) value of 220-280, as measured by GC-FID-MS. The DCR also has an oxygen content of <5%, a density of 0.9 to 1.0 g/cm$^3$ at 20° C., and an acid value of <50 mg KOH/g, as measured using ASTM E28-18.

DESCRIPTION

The following terms will be used throughout the specification with the following meanings unless specified otherwise.

"At least one of [a group such as A, B, and C]" or "any of [a group such as A, B, and C]," or "selected from [A, B, and C]," means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and B means A only, B only, as well as A and B.

A list of embodiments presented as "A, B, or C" is to be interpreted as including the embodiments, A only, B only, C only, "A or B," "A or C," "B or C," or "A, B, or C."

"Collector" means a composition that selectively adheres to a particular constituent of the fine, facilitating the adhesion of the constituent to bubbles from the sparging of a fine bearing slurry. Collector may be used interchangeably with "collector composition."

"Comminuted" means powdered, pulverized, ground or otherwise rendered into fine solid particles.

"Mineral" is used to encompass a pure mineral as well as ore to be beneficiated.

"Fine" means a composition containing a mixture of a more wanted material, the beneficiary, and a less wanted material, the gangue.

"Concentrate" means the portion of fine which is separated from the slurry by flotation and collected within the froth layer.

"Frother" or "Frothing Agent" means a composition that enhances the formation of bubbles and/or preserves the bubbles bearing the hydrophobic fraction from the sparging of slurry.

"Slurry" means a mixture comprising a liquid medium within which fines are dispersed or suspended. The liquid medium may be entirely water, partially water, or may not contain any water at all.

"Sparging" means the introduction of gas into a liquid to create bubbles that migrate up the liquid.

"Tailings" means the portion of the fine which migrates to the bottom of the slurry for removal.

"Selectivity" of the collector refers to the ability of the collector to selectively adsorb onto the surface of the targeted mineral only. Selectivity is directly proportional to performance (grade), e.g., assay concentration at a given recovery is an indication of how selective the collector is.

"Assay" is a chemical test performed on a sample of ores or minerals to determine the amount of valuable metals contained in a sample ("concentrate assay" or "grade").

GPC molecular weights are measured against polystyrene calibration standards using a triple detector array and a mixed column set.

Ring and ball softening point is measured per ASTM E28-18.

Density is measured per ASTM D792-13.

wt. % refers to weight concentration.

The disclosure relates to a method to beneficiate an ore in a froth flotation process. The method comprises adding to a bio-based collector composition to a slurry containing an ore of interest in liquid. The collector comprises a decarboxylated rosin acid.

Decarboxylated Rosin Acid (DCR) Collector: The collector composition, comprises, or consists essentially of a plant derived decarboxylated rosin acid (DCR) collector. As used herein, DCR can be either a crude DCR, a distilled or purified DCR (>90% purity), or mixtures thereof. Crude DCR is almost similar in composition with the distilled DCR, with the heavy fraction (10-15%) being removed to improve color, reduce sulfur, etc.

DCR is produced by the decomposition of rosin acids at high temperatures. Rosin acids are normally solid, having a softening point of, e.g., 65-85° C. Rosin acid is non-petroleum and plant-derived from gum (from pine trees), wood (from tree stumps), and tall oil (by-product from the paper industry). The rosin acids can be fully or partially decarboxylated, forming decarboxylated rosin acid (DCR).

DCR is a mixture of molecules, some of which contain monocarboxylic acids having a general molecular formula, e.g., $C_{20}H_{30}O_2$. In embodiments, DCR is characterized as containing 40-100 wt. % of tricyclic compounds and polycyclic having 18-20 carbon atoms, one or more C═C groups, and m/z (mass/charge) values in the range of 220-280, or 230-270, or 234-262, or 235-265, or >230, or <265 as measured by GC-FID-MS. m/z is defined as the molecular weight (MW) divided by the charge of the compound, which is ~1 for DCR In embodiments, sum of tricyclic compounds as aromatic and cycloaliphatic in the DCR is >50 wt. %, or >55 wt. %, or >60 wt. %, or >74 wt. %, or >90 wt. % of total weight of the DCR. Aromatic DCR is defined as DCR species having a MW of 252 or 256, and cycloaliphatic DCR is defined as DCR species having a MW of 260 or 262.

In embodiments, the amount of cycloaliphatic DCR is >30 wt. %, or >40 wt. %, or >50 wt. %, or >80 wt. %, based on the total weight of the DCR.

In embodiments, total amount of tricyclic compounds as reactive double bond (C═C group) is <45 wt. %, or <40 wt. %, or <30 wt. %, or <10 wt. % of total weight of the DCR. Reactive C═C group is defined as DCR species having a MW of 254 and 258.

In embodiments, the DCR is characterized as having an oxygen content of <5%, or <3%, or <2%, or 0-1%. Oxygen content (in %) in the DCR is calculated as the oxygen to carbon ratio, or the sum of oxygen atoms present divided by sum of carbon atoms present, with the number of oxygen and carbon atoms being obtained from elemental analyses.

In embodiments, the DCR has a density of 0.9-1.0 g/cm$^3$, or 0.91-0.99 g/cm$^3$, or 0.92-0.98 g/cm$^3$, or 0.93-0.97 g/cm$^3$, or 0.94-0.96 g/cm$^3$, >0.9 g/cm$^3$, or <1.1 g/cm$^3$.

The DCR has a low acid value (carboxylic acid content), which is lower than a typical acid number for rosin acid (e.g., about 160). In embodiments, the DCR has the acid value of <50 mg KOH/g, or <45 mg KOH/g, or <40 mg KOH/g, or <35 mg KOH/g, or <30 mg KOH/g, or <25 mg KOH/g, or <20 mg KOH/g, or <15 mg KOH/g, or <5 mg KOH/g, or 2-30 mg KOH/g, or 4-25 mg KOH/g, or 5-20 mg KOH/g, as measured using ASTM D1240-14 (2018) or ASTM D465.

In embodiments, the DCR has an aromatic content of 30-60 wt. %, or 32-56 wt. %, or 35-54 wt. %, or 38-52 wt. %, or 40-50 wt. %, or >30 wt. %, or <45 wt. %, based on the total weight of the DCR, according to ASTM D2140.

In embodiments, the DCR has a naphthenic content of 40-60 wt. %, or 42-58 wt. %, or 45-55 wt. %, or 42-52 wt. %, or >45 wt. %, or <55 wt. %, based on the total weight of the DCR, according to ASTM D2140.

In embodiments, the DCR has a paraffinic content of 20-35 wt. %, or 22-34 wt. %, or 24-32 wt. %, or 26-30 wt. %, or >22 wt. %, or <32 wt. %, based on the total weight of the DCR, according to ASTM D2140.

In embodiments, the DCR is characterized as having viscosities comparable to those of petrochemical base oils, due in part to its relatively high molecular weights, for example, a viscosity of 20-50 cSt, or 22-48 cSt, or 25-45 cSt, or 28-42 cSt, or 30-40 cSt, or >28 cSt, or <45 cSt, according to ASTM D-445, measured at 40° C.

In embodiments, the DCR has an aniline point of 5-40° C., or 10-25° C., or 13-29° C., or <25° C., or >8° C., according to ASTM D611.

In embodiments, the DCR has a pour point of −30 to +10° C., −28 to +8° C., or −25 to +5° C., or >−25° C., or <+5° C., according to ASTM D97.

In embodiments, the DCR has a flash point of 140-160° C., or 142-158° C., or 144-156° C., or 146-154° C., or >146° C., or <154° C., or <160° C., according to ASTM D92.

In embodiments, the DCR has a boiling point of 235-390° C., or >230° C., or <400° C., measured according to D2887.

In embodiments, the DCR has a Gardner Color of 1.0-3.0, or 1.1-2.9, or 1.2-2.8, or 1.3-2.7, or 1.4-2.6, or 1.5-2.5, >1.2, or <2.4, or <3.0, according to ASTM D6166.

In embodiments, the DCR has a sulfur content of <0.05 wt. %, or <0.04 wt. %, or <0.03 wt. %, or <0.02 wt. %, or <0.01 wt. %, or <0.001 wt. %, or 40-200 ppm, or <500 ppm, or <100 ppm, based on total weight of the DCR, measured according to ASTM D5453.

In embodiments, the DCR has a VOC of <5 wt. %, or <4.75 wt. %, or <4.5 wt. %, or <4.25 wt. %, or <4.0 wt. %, or <3.75 wt. %, <3.5 wt. %, <3.25 wt. %, <3.0 wt. %, <2.75 wt. %, or <2.5 wt. %, <2.25 wt. %, <2.0 wt. %, or <1.5 wt. %, <1.0 wt. %, or <0.5 wt. %, based on total weight of the DCR. The VOC of the DCR is measured according to the EPA (Environmental Protection Agency) method 24 or equivalent, by summing the % by weight contribution from all VOCs present in the product at 0.01% or more.

The amount of DCR can be used in any concentration which gives the desired recovery of the ore of interest. In embodiments, the amount of DCR is >0.5 wt. %, or >1 wt. %, or >2 wt. %, or >5 wt. %, or >10 wt. %, or >25 wt. %, or >30 wt. %, or >50 wt. %, or >65 wt. %, or >80 wt. %, or >95 wt. %, or 100%, or 0.5-100 wt. %, or 1-100 wt. %, or 2-100 wt. %, or 5-100 wt. %, or based on the total weight of the collector composition.

Depending on the ore and its condition, collector compositions can be used in an amount ranging from 0.02-20 lb. per ton of ore, or 0.4-10 lb. per ton of ore.

Additional Collector: In embodiments, in addition to the DCR, an additional collector can be added to the collector composition. Examples include, but are limited to, ionic collectors and/or nonionic collectors. Ionic collectors can be anionic collectors (e.g., xanthates, thiophosphates, organic sulfides, carboxylic collectors, and sulfoxy collectors), cationic collectors (e.g., amines and amine salts), and/or amphoteric collectors. Nonionic collectors can be nonpolar collectors and/or heteropolar collectors. In embodiments, the additional collectors can be chosen from amines, fatty acids, fuel oil, motor oil, used motor oil, kerosene, petroleum sulfonate (e.g., lignin), thionocarbamates (e.g., ethyl isopropyl thionocarbamate and methyl butyl thionocarbamates), xanthates (e.g., isopropyl xanthate, amyl xanthate, butyl xanthate, and ethyl xanthate), tall oil, thiophosphates (e.g., dicresyl thiophosphate, di-sec-butyl thiophosphate, diamyl thiophosphate, and diethyl thiophosphate), oleic acid, linoleic acid, xanthogen formate, sodium dodecyl sulfate, and mercaptans (e.g., dodecyl mercaptan).

The amount of additional collector, if present, can be used in an efficient amount to give the desired recovery of the ore of interest, e.g., <98 wt. %, <90 wt. %, <80 wt. %, <65 wt. %, <50 wt. %, <30, wt. %, <25 wt. %, or <10 wt. %, or 0-98 wt. %, or 5-95 wt. %, or 10-80 wt. %, or based on the total weight of the collector composition.

In embodiments, the collector composition comprises DCR collector and additional collector in a weight ratio of 0.5:99.5 to 99.5:0.5, or 1:99 to 99:1, or 2:98 to 98:2, or 5:95 to 95:5, or 10:90 to 90:10, 20:80 to 80:20, 25:75 to 75:25, or 50:50 (DCR: additional collector).

Optional Components: In addition to the collector, other components can be added to the slurry composition or the collector composition. Examples include, but not limited to, frothing agents, depressants, activators, modifiers and combinations thereof.

Non-limiting examples of frothing agents include pine oil, methyl isobutyl carbitol (MIBC) and other alcohols of similar molecular weight, glycols and polyglycols, glycol and polyglycol ethers of aliphatic alcohols such as cyclohexanol.

Non-limiting examples of depressants include urea formaldehyde polymers and oligomers. Further examples of depressants include: cyanide salts; sodium sulphide/hydrosulphide; sulphites; waterglass; polysaccharides such as starch, chemically modified polysaccharides like carboxymethylcellulose (CMC); natural gums like guar gum, agar, alginic acid, glucan, carrageenan, chicle gum, gellan gum, glucomannan, gum arabic, locust bean gum, psyllium seed husks, alginates, spruce gum, tara gum, and xanthan gum; and chemically modified natural gums.

Examples of activators include inorganic commodity chemicals, such as copper ions (e.g., sulfates and chloride), aluminum salts (e.g., nitrates and sulfates), sodium sulfide, silicates (e.g., sodium and potassium), carbonates (e.g., sodium), hydroxides (e.g., sodium and calcium), lead acetate, and sodium hydrosulfide.

Non-limiting examples of modifiers include: lime, soda ash, alum, ammonia, caustic soda, phosphates, sodium silicate, sulfur dioxide, lignosulfonate, cationic modifiers (e.g., Ba2+, Ca2+, Cu+, Pb2+, Zn2+, and Ag+), anionic modifiers (e.g., SiO32−, PO43−, CN—, CO32−, and S2−), organic modifiers (e.g., dextrin, starch, glue, and carboxymethylcellulose), sulfuric acid, and hydrochloric acid. The modifier can be selected to alter the pH of an aqueous slurry depending on the ore to be recovered, e.g., increasing the pH from 9 to 12, or decreasing the pH from 2-3.

The additional components, depending on the ores, are present in an amount of <20 wt. %, <15 wt. %, <10 wt. %, <5 wt. %, <3 wt. % or <1 wt. %, or 0.01-20 wt. % or 0.5-20 wt. % or 1-20 wt. %, or 3-15 wt. %, based upon the total weight of the slurry composition.

Ore: The methods can be used with ores, including, but not limited to, iron, phosphate, barite, coal, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, and kaolin; noble metals, such as ruthenium, rhodium, palladium, silver, osmium, iridium, platinum, gold, mercury, rhenium and copper; refractory metals, such as niobium, molybdenum, tantalum, and tungsten, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof. In embodiments, the mineral is phosphate or potash.

Liquid Medium: The slurry comprises a liquid, which can be any of water, alcohol, aromatic liquid, phenol, azeotropes, and any combination thereof, in an amount such that the solid content of the slurry is >15%, or 20-80%, or 20-70%, or 20-60%, or 20-50%, or <85%, based on the total weight of slurry composition.

Performance Properties: Slurry compositions containing the DCR collector are characterized as providing same or better performance compared to slurry compositions containing fossil fuels, e.g., diesel fuels, as collectors. The collector may also be utilized to control froth and/or influence froth behavior.

In embodiments, the collector compositions comprising DCR increase the recovery of a mineral at a given concentrate assay, when compared to fossil fuel collectors, of >0.5%, or >1%, or >1.5, or >2, or >3%, or >5%, or >10%, or >15, or >20%, or >30%, or >40%, or 0.5% to 50%, or 1-50%, or 2-45%, or 5-40%.

In embodiments, the collector compositions comprising DCR increase concentrate assay at a given recovery of a mineral, when compared to fossil fuel collectors, from >0.5%, or >1%, or >1.5, or >2, or >3%, or >5%, or >10%, or >15, or >20%, or >30%, or >40%, or 0.5% to 50%, or 1-50%, or 2-45%, or 5-40%.

Applications and Methods for Use: Any suitable froth flotation cell and method of operation of a froth flotation cell can be used with the DCR collector.

In embodiments, the collector composition is used in both direct and indirect flotation processes. In direct flotation the targeted mineral for concentration is floated with use of the collector composition. In reverse or indirect flotation processes the targeted mineral for concentration is depressed and the contaminant or undesirable species are floated with use of the collector composition. The collector composition to be added to the slurry can consist essentially of the DCR only, comprises DCR and additional collector, or comprises DCR, an additional collection and optional components, to be added together, or to be added separately in two steps with the more selective collector to be added first.

In embodiments, the following components are added to form a slurry: ore, collector, optional components, and a liquid medium. In embodiments, the ore is comminuted prior to adding to the slurry. The components can be added simultaneously or in any possible order. Any, one, some, or all, of the components can be pre-mixed together before being added to the slurry or added separately in the flotation step.

In embodiments, a froth flotation process for beneficiating an ore includes the steps of: (a) forming a slurry comprising a liquid medium and an ore; (b) contacting the slurry with a collector composition; (c) sparging the slurry; and (d) collecting the beneficiated ore. In embodiments, the process comprises adding optional components. In embodiments, the slurry can be an aqueous slurry.

In embodiments, a froth flotation process for beneficiating an ore includes the steps of: (a) forming a slurry comprising a liquid medium, an ore, and a collector composition, (b) sparging the slurry; and (c) collecting the beneficiated ore. In embodiments, the slurry includes optional components.

In embodiments, the slurry is agitated following addition of the collector composition.

In embodiments, the mineral ore is phosphate. The phosphate can be separated from other minerals in the slurry, e.g., any of carbonate dolomite, calcite, quartz, and silicate.

In embodiments, the collector can be selective for phosphate. In embodiments, an ore slurry comprising phosphate can be subjected to a desliming step prior to froth flotation. In embodiments, a collector composition as described herein can be used to separate phosphate from the slime fraction.

Examples: The following illustrative examples are non-limiting.

In the examples, phosphate ore was beneficiated, using an anion collector in the first direct flotation of the Crago Double Flotation process. The measured responses were concentrate assay and recovery of phosphate (P2O5). In the examples, collector compositions comprising a DCR, a thermal DCR, or a diesel fuel, with a fatty acid were compared.

The DCR used in the examples is from Kraton Corporation, having the properties as shown in Table 1.

A thermal DCR was made by heating rosin acid to 320° C. at 40° C./hr. and held at 320° C. for 75 hours until reaching an acid number of 80 mg KOH/g. The properties of the thermal DCR are in Table 1 below.

#6 diesel fuel oil is a residual with hydrocarbons in the C20 to C70 range with a boiling point of 212-589° C., an acid number of <2.5, and a flash point of >65° C.

TABLE 2

Properties of DCR and thermal DCR

| Property | Thermal DCR | DCR |
|---|---|---|
| Acid Number mg KOH/g | 80 | 7 |
| Viscosity, 'cSt @ 40° C. | — | 46.7 |
| Density, 40° C. | — | .95 |

TABLE 2-continued

Properties of DCR and thermal DCR

| Property | Thermal DCR | DCR |
|---|---|---|
| % O2 content | 4.5 | 0.39 |
| Tricyclic Compounds, % | 72.3 | 69.5 |
| MW 238 | 5.4 | 0.0 |
| MW 252 - aromatic | 0.4 | 15.7 |
| MW 254 - reactive double bond | 2.7 | 0.1 |
| MW 256 - aromatic | 9.6 | 40.3 |
| MW 258 - reactive double bond | 4.7 | 0.4 |
| MW 260 - cycloaliphatic | 3.1 | 0.7 |
| Mono-unsaturated Abietic acids | 5.4 | 0.0 |
| Dehydroabietic acid | 32.3 | 0.0 |
| Unidentified | 3.3 | 6.9 |
| Thermal trimer | 19.6 | 7.1 |
| other | 4.4 | 3.1 |
| TOTAL | 100.0 | 98.9 |

Additional collector used in the examples is a tall oil fatty acid ("TOFA") as SYLFAT FA1, from Kraton Corporation with an acid number of 194 mg KOH/g, a Gardner color of 4.5 and contains 2.5% rosin acids.

10% potassium hydroxide (KOH) solution was used to modify the pH.

The sample collector compositions contained either diesel fuel oil #2, diesel fuel oil #6, or DCR as the collector, and the additional fatty acid collector described above. Each collector composition contains a ratio of 1.2:2 of the fuel oil/DCR:fatty acid.

TABLE 3

Collection Compositions

| | Collector | Additional Collector |
|---|---|---|
| Collector Composition 1 | diesel fuel #6 | TOFA |
| Collector Composition 2 | thermal DCR | TOFA |
| Collector Composition 3 | DCR | TOFA |

The feed ores used in the examples are 5.24% P2O5. The ore was tested with two ranges of collector dosages: 0.45 g/kg-dry feed and 0.60 g/kg-dry feed.

The feed ore was conditioned in a 1 L beaker using an agitator/mixer. In each test, about 500 grams (dry basis) of the flotation feed sample is used. Water is added to make-up the designated solids level of about 75% solids. Oil/DCR and fatty acid blends are pre-weighed and added to the conditioning cell. Base, 10% potassium hydroxide (KOH) solution, is added to obtain target pH, between 9.0-9.2. The agitator is run at 900 RPM for 2 minutes.

Flotation is conducted in a Metso cell. The conditioned feed is washed into the flotation cell with the agitator running (1300 RPM) and the air valve off. The cell is filled with water to about 6 mm below the overflow lip. Flotation is conducted at about 30% solids. Flotation is started when the air valve is opened. The concentrate is skimmed out of the cell with a paddle and collected into a pan. During flotation, reagents and particles that stick on the cell wall and the impeller shaft are washed off periodically with the water hose. The cell level should be held constant by continuous addition of water to the cell. The process is continued until there is no more visible ore at the top. The total flotation time is feed and reagent dependent, which is typically 1 minute.

The flotation test products—concentrate and tailings—are poured into separate pans and dewatered by decanting. Ore samples (concentrate and tailings) are placed in −105° C. oven overnight then weighed. Samples are digested according to Association of Florida Fertilizer and Phosphate Chemists manual (AFPC 2010). Analytical results are analyzed using a Lachat QuickChem P2O5 analyzer, according to AFPC certified Check 22 standards.

Notations f, c, and t are the assays (P2O5) of the feed, concentrate, and tailings respectively.

$$\text{Concentrate Assay} = \frac{\text{wt \% P2O5}}{\text{wt \% Sample}}$$

$$\text{Recovery} = \left(\frac{c}{f}\right)\left(\frac{f-t}{c-t}\right) * 100$$

Concentrate assay (P2O5) was plotted vs % P2O5 recovery for each Oil/DCR:fatty acid collector at the dosages above and reported in tables below.

The % recovery and concentrate assay for the phosphate ore, having a % P2O5 of 5.24, is in Table 4.

TABLE 4

% Recovery and Concentrate Assay

| Collection Composition | Collector Dosage (g/kg-dry feed) | % Recovery P2O5 | Concentrate Assay P2O5 |
|---|---|---|---|
| Collector Composition 1 | 0.45 | 93 | 11.6 |
| Collector Composition 2 | | 96 | 12.6 |
| Collector Composition 3 | | 96 | 20.5 |
| Collector Composition 1 | 0.60 | 95 | 13.3 |
| Collector Composition 2 | | 97 | 12.6 |
| Collector Composition 3 | | 96 | 19.9 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for the beneficiation of an ore in a froth flotation process, the method comprising:

providing a slurry comprising the ore dispersed in a liquid medium;

contacting the slurry with a collector composition comprising a decarboxylated rosin acid ("DCR"), wherein the DCR comprises 40 to 100 wt. % of tricyclic compounds having 18-20 carbon atoms, one or more C═C groups, and m/z (mass/charge) value of 220-280, as measured by GC-FID-MS, wherein sum of tricyclic compounds as aromatic DCR species having a MW of 252 or 256 and cycloaliphatic DCR species having a MW of 260 or 262 in the DCR is >50 wt. %; and wherein the DCR has:

an oxygen content of <3%;

a density of 0.9 to 1.0 g/cm$^3$ at 20° C.; and an acid value of <30 mg KOH/g;

sparging the slurry to form a froth layer containing a concentrate and a bottom layer containing tailings; and recovering the concentrate from the froth layer as the beneficiated ore.

2. The method of claim 1, wherein the DCR has >25 wt. % aromatic content, >40 wt. % naphthenic content, and >15 wt. % paraffinic content, based on total weight of the DCR.

3. The method of claim 1, wherein the DCR has 30-60% wt. % aromatic content, 40-60 wt. % naphthenic content, and 20-35 wt. % paraffinic content, all based on total weight of the DCR.

4. The method of claim 1, wherein the DCR has at least one of:

a Brookfield viscosity of 20-50 cSt, measured at 40° C.;

an aniline point of at least 15° C.;

a pour point of less than 30° C.;

a sulfur content of <0.05 wt. %;

a Gardner color of <3; and a flash point of <160° C.

5. The method of claim 1, wherein the DCR comprises >30% by weight of tricyclic compounds as cycloaliphatic.

6. The method of claim 1, wherein the DCR comprises >60% by weight of tricyclic compounds as aromatics and cycloaliphatic.

7. The method of claim 1, wherein the DCR comprises <30% by weight of tricyclic compounds as reactive double bond.

8. The method of claim 1, wherein the collector composition is present in an amount ranging from 0.02 lb. per ton of ore to 20 lb. per ton of ore.

9. The method of claim 1, wherein the slurry is from 20-80% by weight solids.

10. The method of claim 1, wherein the collector composition is to facilitate recovery of the mineral from the slurry in a direct flotation process or a reverse flotation process.

11. The method of claim 1, wherein the collector composition further comprises an additional collector selected from ionic collectors, nonionic collectors, amines, fatty acids, fuel oil, motor oil, used motor oil, kerosene, petroleum sulfonate, thionocarbamates, xanthates, tall oil, thiophosphates, oleic acid, linoleic acid, xanthogen formate, sodium dodecyl sulfate, mercaptans, and combinations thereof, at a weight ratio of DCR to the additional collector between 0.5:99.5 to 99.5:0.5.

12. The method of claim 1, wherein the ore is iron, phosphate, barite, coal, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, kaolin, noble metals, refractory metals, rare earth metals, or mixtures thereof.

13. The method of claim 1, wherein collector has increased recovery at a given concentrate assay or an increased concentrate assay at a given recovery of at least 0.5% when the mineral of interest is phosphate.

14. A method for the beneficiation of an ore in a froth flotation process, the method comprising:

providing a slurry comprising:

an ore comprising a mineral of interest;

a liquid medium;

a collector composition comprising a decarboxylated rosin acid ("DCR"), wherein the DCR comprises 40 to 100 wt. % of tricyclic compounds having 18-20 carbon atoms, one or more C═C groups, and m/z (mass/charge) value of 220-280, as measured by GC-FID-MS, wherein sum of tricyclic compounds as aromatic DCR species having a MW of 252 or 256 and cycloaliphatic DCR species having a MW of 260 or 262 in the DCR is >50 wt. %; and wherein the DCR has:

an oxygen content of <3%;

a density of 0.9 to 1.0 g/cm$^3$ at 20° C.; and an acid value of <30 mg KOH/g;

sparging the slurry to form a froth layer containing a concentrate and a bottom layer containing tailings; and recovering the concentrate from the froth layer as the beneficiated ore.

15. The method of claim 14, wherein the DCR has >25 wt. % aromatic content, >40 wt. % naphthenic content, and >15 wt. % paraffinic content, based on total weight of the DCR.

16. The method of claim 14, wherein the DCR has 30-60% wt. % aromatic content, 40-60 wt. % naphthenic content, and 20-35 wt. % paraffinic content, all based on total weight of the DCR.

17. The method of claim 14, wherein the DCR has at least one of:

a Brookfield viscosity of 20-50 cSt, measured at 40° C.;

an aniline point of at least 15° C.;

a pour point of less than 30° C.;

a sulfur content of <0.05 wt. %;

a Gardner color of <3; and a flash point of <160° C.

18. The method of claim 14, wherein the collector composition is present in an amount ranging from 0.02 lb. per ton of ore to 20 lb. per ton of ore.

19. A slurry composition for the beneficiation of an ore in a flotation process, the composition comprising:

an ore comprising a mineral of interest;

a liquid medium; and a collector composition in an amount of 0.02-20 lb. per ton of ore, comprising:

>0.5 wt. % of a decarboxylated rosin acid ("DCR"), wherein the DCR comprises 40 to 100 wt. % of tricyclic compounds having 18-20 carbon atoms, one or more C═C groups, and m/z (mass/charge) value of 220-280, as measured by GC-FID-MS, wherein sum of tricyclic compounds as aromatic DCR species having a MW of 252 or 256 and cycloaliphatic DCR species having a MW of 260 or 262 in the DCR is >50 wt. %; and wherein the DCR has:

an oxygen content of <3%;

a density of 0.9 to 1.0 g/cm$^3$ at 20° C.; and an acid value of <30 mg KOH/g;

<99.5 wt. % of an additional collector; and optional components, in an amount of <20 wt. %, selected from a frothing agent, a depressant, an activator, a modifier, and combinations thereof, based on the total weight of the slurry.

20. The method of claim 19, wherein the DCR has >25 wt. % aromatic content, >40 wt. % naphthenic content, and >15 wt. % paraffinic content, based on total weight of the DCR.

* * * * *